March 20, 1962 C. T. WARD ET AL 3,025,596
BRAZE BONDING OF CONCENTRIC TUBES AND SHELLS AND THE LIKE
Filed June 26, 1959 3 Sheets-Sheet 1
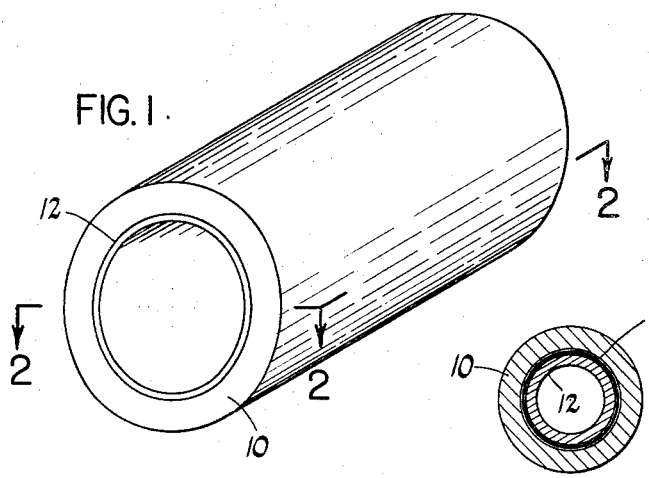
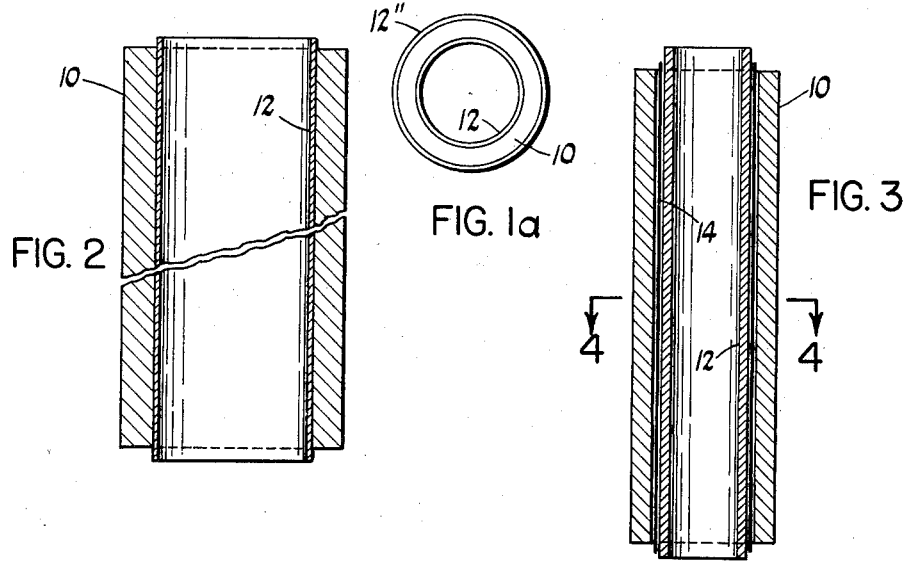
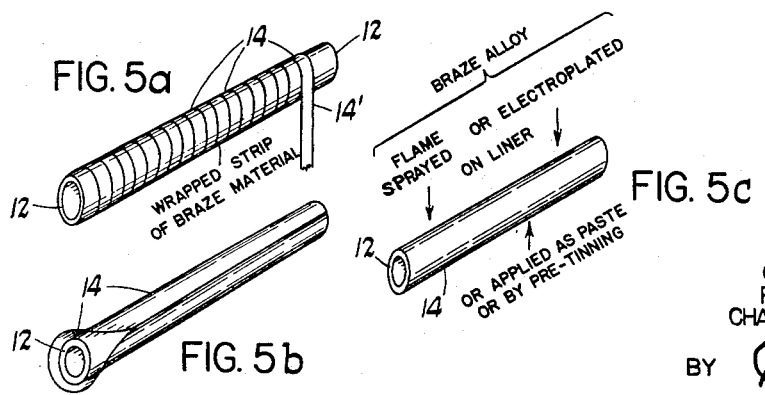
INVENTORS:
CHARLES. T. WARD
RICHARD M. OLIVER
CHARLES R. PANDELIS
BY C. F. Bryant
ATTORNEY INVENTORS:
CHARLES T. WARD
RICHARD M. OLIVER
CHARLES R. PANDELIS
BY C. H. Bryant
ATTORNEY

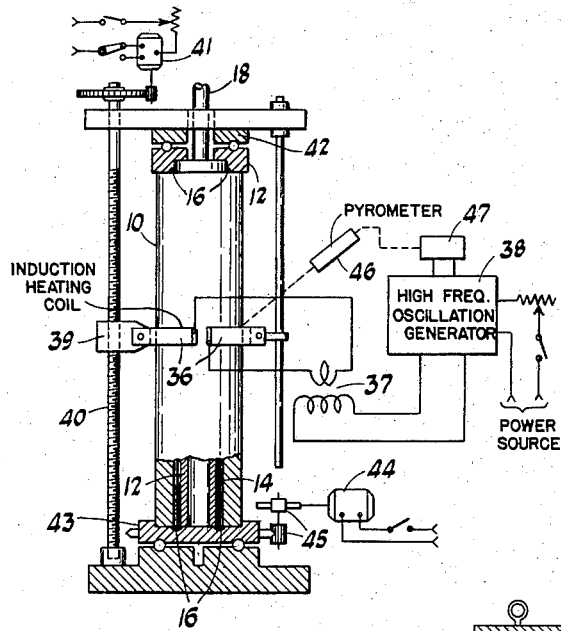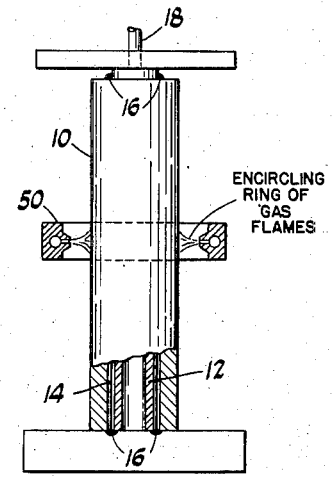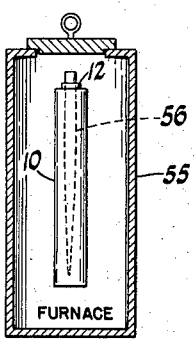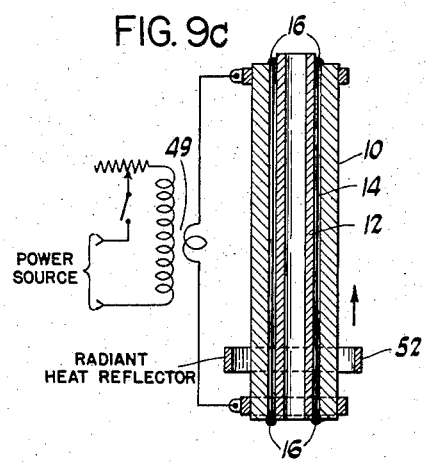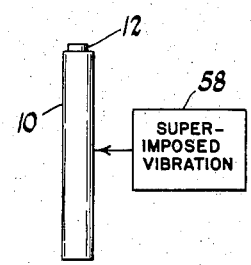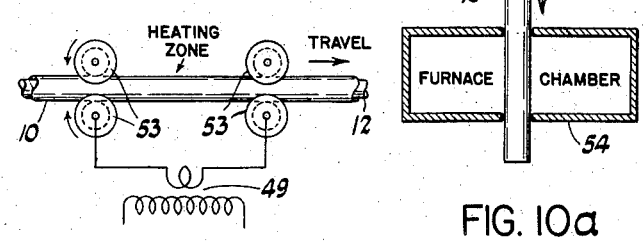

United States Patent Office 3,025,596
Patented Mar. 20, 1962

3,025,596
BRAZE BONDING OF CONCENTRIC TUBES
AND SHELLS AND THE LIKE
Charles T. Ward, Richard M. Oliver, and Charles R. Pandelis, Chattanooga, Tenn., assignors to Combustion Engineering, Inc., New York, N.Y., a corporation of Delaware
Filed June 26, 1959, Ser. No. 823,141
8 Claims. (Cl. 29—471.1)

Our invention relates to methods for cladding or joining metals and to the products resulting therefrom, and it has special reference to such methods and products when the metal parts involved are in the form of concentric tubes or shells or other members of containment.

Broadly stated, the object of our invention is to provide an improved technique for bonding together concentric tubes or shells or other similarly mating parts that are formed of materials which are compatible with the process of brazing.

A more specific object is to effect the bonding through the medium of a unique combination of brazing and/or soldering operations which are applied in a novel and improved manner and which result in a product of quality that is unexpectedly superior.

A further object is to accomplish such braze bonding without use of the fluxing agents or the protective atmosphere or the near-perfect vacuum which heretofore have been required for the successful brazing of metal parts composed of certain "refractory" alloys.

A still further object is to provide a process wherein a liner such as of stainless steel can be applied to the backing material which may then be heat treated to develop high physical properties and thereafter fabricated by welding into pressure or containment or conduit parts or the like.

An additional object is to braze bond two or more layers of concentric tubing or the like into an integral assemblage which has good heat transfer through the multi-layer wall and which incorporates a low cost material for strength that is protected on either or both sides by a more expensive material affording corrosion and heat resistance.

In practicing our invention, we select or prepare the mating metal parts to provide dimensional tolerances appropriate for the various methods of assembly; we then place the brazing material on or adjacent to one or all of the mating surfaces; we assemble the mating parts together in nesting relationship after or during such placement of the braze material; we next effect an extremely intimate contact throughout all joint surfaces by causing expansion or deformation of the mating parts in a direction either radial or perpendicular to the joint, which contact excludes air from the joint and prevents harmful oxidation or nitridation in the joint area when subsequently heated to brazing temperature; and we then braze the assembled parts together by heating them to the appropriate temperature for the appropriate time and thereafter cooling the parts in a manner proper for the particular materials involved, with such brazing producing a bond which is both integral and continuous.

In some cases appropriate means are required to effect gradient heating and/or cooling in order to secure progressive solidification and/or melting of the braze material; and additionally further means may in certain instances be required to maintain intimate contact of the joints during the heating and/or cooling cycle.

After brazing, the assembly may if desired be carried through additional fabrication stages such as heat treatment, hot or cold working, welding into other assemblies, etc., dependent upon the materials involved and the intended use.

The foregoing brazing is done without any need for or use of the fluxing agents or the protective atmosphere or the near-perfect vacuum which heretofore have been required for the successful brazing or soldering of many alloy materials using the conventional methods. By using our improved process we are able to produce a pipe or tubing clad either internally or externally or on both surfaces with the other members which are integrally and continuously bonded upon the mating surface of the tubing.

Illustrative embodiments of our invention will now be described by reference to the accompanying drawings wherein:

FIGURE 1 is a perspective view of one typical tubular assemblage which results from the practice of our invention;

FIGURE 1a shows an assemblage consisting of three separate layers, each of which may be of a different material, or of the same single material type, or may be chosen from two material types;

Figure 6A:
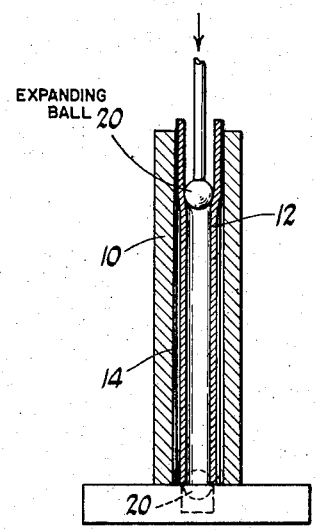
Figure 6B:
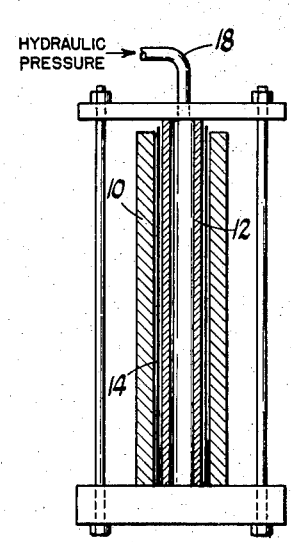
Figure 7B:
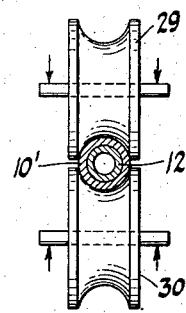
Figure 7A:
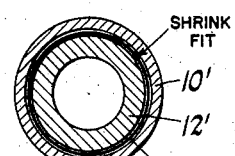
Figure 8:
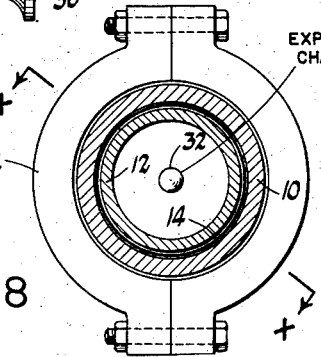
Figure 8X:
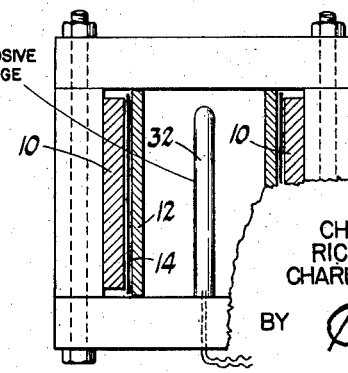

FIGURE 2 is a section on line 2—2 of FIGURE 1 showing how the inner lining 12 has been intimately braze bonded to the outer tube of base metal 10 which surrounds it;

FIGURE 3 is a similar sectional showing of how the parts 10 and 12 and 14 are concentrically assembled in preparation for the braze bonding attachment of part 12 to part 10;

FIGURE 4 is a section on line 4—4 of FIGURE 3 drawn to show how the intermediate layer of braze material 14 first is positioned between the inner tubular lining 12 and the outer surrounding tube 10;

FIGURES 5a-b-c respectively indicate how the braze material layer 14 may be placed around the inner tubular lining by strip wrapping or by lengthwise enfoldment or by flame spraying or electro plating or as a paste or by pre-tinning;

FIGURES 6a-b-c-d-e are illustrations in simplified schematic form which show how the inner liner 12 with its braze material layer 14 can be expanded into intimate contact with the surrounding outer tube 10 by using an expanding ball or via hydraulic pressure applied inside of the tubular lining or via a piston exerting force on a core of rubber-like material or by a combination of "a" and "b" or via expanding rolls, FIGURES 7a and 7b respectively represent how an outer tube of cladding material 10' with an interior layer of braze material 14 can be intimately compressed against the surface of a base-metal tube 12' inside thereof either by a shrink fit technique or by the aid of external compressing rolls;

FIGURES 8 and 8x show apparatus in which the necessary compression is accomplished by the aid of an explosive charge;

FIGURES 9a-b-c-d respectively indicate how the prepared tubular assemblage can after compression of the braze material between the mating parts be heated to the necessary brazing temperature by means of an electrical inductor coil or via an encircling ring of gas flames or by the passage of an intense electrical current through the tube metal;

FIGURES 10a and 10b show accomplishment of a similar heating in furnace chambers; and FIGURE 11 illustrates the use of superimposed vibration to improve the quality of the brazed joint.

In these various drawing views an outer and larger tubular member is designated as 10, an inner and small tubular member as 12, and an intermediate layer of braze material as 14; and in the finished product of FIGURES 1–2 such lining 12 has been intimately and integrally "braze bonded" to the surrounding tube 10 of base metal. This attachment is accomplished with marked advantage and unexpected benefit through a practice of our inventively new technique which FIGURES 5 through 11 diagram in simplified schematic form.

We recognize the use of brazing itself is not a new concept; however our combined method of applying the brazing material 14 and obtaining the proper contact between it and the two parts 10 and 12 to be bonded together is distinctively new and inventively novel, and it has been unexpectedly successful. The brazing of materials which heretofore have required a protective atmosphere or fluxing agents or near-perfect vacuum incident to brazing no longer require it in the new method we have developed; the finished product of FIGURES 1–2 is found to be free of defects such as the lack of bond as determined by ultrasonic testing, dye penetrant testing, bend testing and metallographic examination; and these brazed assemblies of our invention can withstand the thermal shock of being quenched in brine from 1650° F. when high temperature brazing materials are used.

We find that our new technique is applicable to members 10 and 12 whose sizes are anything from extremely small diameter tubes or shells, etc. up to very large diameter pipe or shells, etc.; that the wall thicknesses are not critical and can be varied widely; that the base material member 10 can be of conventional carbon steel or other ferrous composition or even of metal other than iron; and that the liner member 12 can be of conventional stainless steel or the nickel base alloys or other so-called "refractory" alloys based on titanium, zirconium, molybdenum, etc. The thicknesses of these illustrative members 10 and 12 can be varied within extremely wide limits; moreover, multiple-layer assemblies (more than two, such as FIG. 1a represents) likewise can be produced with thickness ranges and material types and locations in the assembly interchanged as desired. Still further, our methods are adapted to the formation of tubular assemblages of unlimited lengths.

Selection and Placing of Braze Material Layer 14

The brazing material 14 can be selected from a wide range of available materials now in common use, or it may be a new or special brazing material, or it can very likely be chosen from new materials to be developed in the future. Examples of brazing materials 14 successfully employed by us include: (1) copper of commercial purity; (2) the various silver and copper base brazing alloys; (3) the various nickel base alloys for high temperature use; (4) the manganese base alloys; and (5) the gold and palladium base alloys.

These may be applied in the form of a metallic strip such as FIGURE 5a shows at 14', or such strip 14' alternatively may consist of resin-bonded powdered metal; and instead of being wrapped helically as FIGURE 5a shows, either of these braze materials can be applied via the longitudinal envelopment represented at 14 in FIGURE 5b. Moreover, such strips 14' and 14 can if desired be placed inside the outer member 10, instead of initially surrounding the inner member 12; or the three work pieces 14 and 12 and 10 can of course be assembled simultaneously.

FIGURE 5c further indicates how the needed layer 14 of brazing material may if desired be applied by the well known flame spraying or metallizing technique, or by electroplating; or it also may be applied as a paste consisting of metal powder with a suitable cementing agent, or by pre-tinning the surface with the brazing material. Even though shown as placed on the inner member 12, the brazing material 14 of FIGURE 5c may instead be added in the above fashion to the inner surface of the outer member 10; or, if desired, to both the surfaces of a given joint.

Gaining Intimate Joint Contact Prior to Brazing

Looking first at FIGURES 6 through 8, the various methods there shown for gaining intimate joint contact prior to brazing are, with the exception of the "explosive" technique of FIGURES 8—8x, common and practical techniques widely used in other fabrication processes; moreover, still other equivalent techniques that achieve the same results also can be substituted and utilized.

In employing these various methods, we find it advantageous in certain instances but not in all, to process or select members 10 and 12 such that in the initial condition the yield strength or flow stress of member 10 exceeds that of member 12. Where member 10 is a heat treatable alloy, this condition may be obtained by prior heat treatment. Or, where the work pieces are produced by cold working operations, member 10 can be selected in the worked-hardened condition and member 12 in the annealed or softened condition.

Figure 6C:
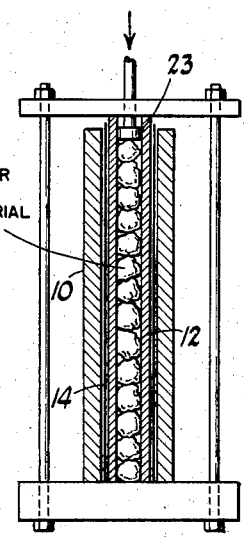
Figure 6E:
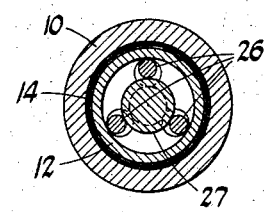
Figure 6D:
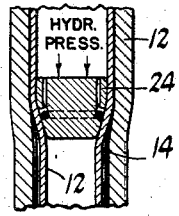

The FIGURE 6a apparatus gains the intimate joint contact mentioned by utilizing a ball or mandrel 20 which expands the assemblage of nested parts 10—14—12 in the progressive manner indicated; the FIGURE 6b apparatus accomplishes the expansion by means of internal hydraulic pressure introduced via connection 18; and in FIGURE 6c a similar expanding action is achieved through a rubber-like material 22 loaded with a piston 23. FIGURE 6d combines the actions of "a" and "b" through utilization of a special mandrel 24 which is driven through by the force of hydraulic pressure; and FIGURE 6e uses conventional tube rolls 26 and associated tapered mandrel 27 for expanding the assemblage parts.

FIGURE 7a shows conventional "shrink" fitting for gaining intimate contact for relatively large diameter and short length work pieces; here either the outer member 10' is preheated before assembly or the inner member 12' is precooled, or both are done. In FIGURE 7b we have shown the use of conventional pressure rolls 29—30 which by reducing the diameter of outer member 10' achieve intimate joint contact.

FIGURES 8—8x illustrate the use of an explosive charge 32 to force member 12 into intimate contact with the joint 14 and outer member 10. A back up die such as represented at 34 may be needed for restraining member 10 where the wall thickness ratio of 10 to 12 decreases below a certain range, dependent upon the materials involved. Charge 32 may be a form of dynamite or one of many forms of high explosives commercially available. Such explosive technique is particularly adapted for, but not limited to nor always essential for, multiple layer (more than two) assemblies, or where inner member 12 has either a lower modulus of elasticity than outer member 10 or a higher yield strength.

Applying Heat to Achieve High Quality Braze Joint

Looking next at FIGURES 9 through 11, the various methods there shown are for applying heat to the assemblage 10—14—12 in a proper manner to achieve a high quality braze joint; and they for the most part again embody practical and commonly used industrial heating equipment and techniques. Each assemblage may be prepared for brazing via this FIGS. 9–11 apparatus by having temporary seal welds 16 or the like (FIGS. 9a–b–c) applied circumferentially to each of its two ends between members 10 and 12 thereof.

In FIGURE 9a progressive induction heating followed by progressive cooling and solidification is utilized. Here a conventional inductor coil 36 surrounds the assemblage 10—14—12 and receives alternating energizing current via transformer 37 from a high frequency oscillation generator shown at 38 or from a motor generator set (not shown), or it may be activated directly from the power source through low-frequency transformers (also not shown). The optimum frequency for the current supplied to the inductor coil 36 is a function of the type materials used plus the wall thicknesses and diameters involved.

When energized, coil 36 imparts heat to that relatively narrow lengthwise band of the assemblage 10—14—12 which is encircled by the coil; and during operation said inductor coil 36 moves lengthwise relative to the assemblage 10—14—12. Such movement is achieved in FIGURE 9a via mount 39 carried on threaded rod 40 that is driven at a controlled or adjustable speed by a reversible motor 41. Direction of coil movement will be up from bottom to top when the assemblage is mounted vertically, or in either direction when the assemblage is mounted horizontally. In conjunction with the rate of power input this movement is such as to maintain the desired heating rate, brazing temperature, dwell time and cooling or solidification rate appropriate to the materials and the size of workpiece involved.

It sometimes is advantageous to continuously rotate the assemblage 10—14—12 relative to the inductor coil 36; and in FIGURE 9a one of many provisions for doing this takes the form of upper and lower bearings 42 and 43 plus a motor 44 which when energized drives the lower mount 43 via gearing 45. Purpose of such rotation is to reduce any circumferential temperature gradient at the heat zone immediately inside the coil 36. Automatic control of heating current intensity and/or travel speed may if desired be provided through a pyrometer device 46 which senses temperature and supplies a proportional signal to the control unit 47 (here shown only for current intensity control).

In FIGURE 9b the heating method shown is equivalent to that of FIGURE 9a except that an encircling ring 50 of gas flames is substituted for the inductor coil 36. Such gas flame heat source 50 has imparted thereto (through means not shown) the same progressive mechanical movements as have been described for the coil 36 of FIGURE 9a.

In FIGURE 9c, the necessary heating is achieved by passing a heavy electrical current from transformer 49 through the full length of tubular members 10—12—14. Such resistance heating current is adjusted to yield the desired heating rate and brazing temperature in the assemblage 10—14—12. In some cases but not all we find it beneficial to induce a lengthwise temperature gradient during either heating or cooling or both, in order to produce progressive melting or solidification. FIGURE 9c shows how this can be accomplished via use of a radiant heat reflector 52 which surrounds the workpiece and is movable lengthwise thereof, as in the direction of the arrow.

In operation of this FIGURE 9c apparatus with the reflector device 52, the workpiece 10—14—12 is first brought up to a temperature below the solidus temperature of the brazing material 14 by passing the high electric current through the tubular length; the heat reflector 52 held in concentric relation to the work piece (by suitable means not shown) is moved axially along the length at a rate which achieves the maintains the desired brazing temperature within a local band shadowed by the reflector, and also achieves and maintains the desired dwell time and heating and cooling rates.

Further possible means for inducing the aforementioned temperature gradient for the FIGURE 9c apparatus may include other external members (not shown) which function as heat sinks or heat reflectors and have a configuration suitable for causing a lengthwise gradient when said members are moved in proximity or otherwise relative to the workpiece. Gradient cooling also can be accomplished by an air blast (not shown) or water spray (not shown) or equivalent means having an intensity lengthwise of the workpiece which is variable so as to obtain the desired temperature gradient.

In FIGURE 9d resistance heating again is employed. The electrodes transferring current to the workpiece are in the form of closely spaced rolls 53 which also feed the workpiece 10—14—12 through at the proper rate for maintaining the desired brazing temperature and dwell time plus heating and cooling rates. Here, as in FIGURES 9a and 9b, progressive melting and progressive solidification of the brazing material 14 is inherent in the process.

FIGURES 10a and 10b each show how the workpiece 10—14—12 can be heated in a furnace chamber. In FIGURE 10a the tubular assemblage is progressively lowered through the chamber 54, the travel speed and furnace temperature being controlled to achieve desired brazing temperature and dwell time plus heating and cooling rates. Progressive melting and solidification are likewise inherent with this apparatus.

In FIGURE 10b the workpiece is placed in the furnace chamber 55 and heated in its entirety, then removed for cooling. If desired a temperature gradient and progressive melting and solidification can be achieved by use of a tapered pin 56 (shown dotted in FIGURE 10b) placed inside the workpiece with the large end at the top when assemblage is vertical. Such tapered pin 56 acts as a heat sink variable down the length of the workpiece and retards heating and cooling proportional to its sectional mass. Still other of the means described under FIGURE 9c (but not illustrated in 10b) may also be utilized in conjunction with FIGURE 10b for establishing these temperature gradients.

Concerning FIGURE 11, it has been found that superimposed vibration of the assembly 10—14—12 during melting and solidification tend to promote wetting of the joint surfaces and tend to eliminate shrinkage cavities. In instances where needed for quality improvement, such vibration may be applied from pneumatic or electrical vibrator devices or by ultrasonic transducers, indicated generally at 58, while the braze joint is above the solidus temperature. Vibration frequencies in the range of from 100 cycles per second upwards to ultrasonic frequencies have been found to impart benefit.

*Inner Member 12 Snugly Hugged by Outer Member 10 During the Brazing*

In a majority of instances we find that the intimate contact at joint 14 which initially is obtained, by the techniques of FIGS. 6 through 8 in preparation for the brazing, continues to maintain itself when the assemblage 10—14—12 thereafter is heated and cooled as per FIGS. 9 through 11 for accomplishing the final braze bonding attachment; i.e. the residual compression put into the inner member 12 and the residual tension put into the outer member 10 by the FIGS. 6-8 preparation treatments both usually continue themselves during and after the brazing treatments of FIGS. 9-11.

Occasions arise, dependent upon thermal expansion behavior of the materials 10—12 and the shrinkage coefficient of the brazing material 14, wherein the intimate joint contact originally achieved prior to the brazing may tend to loosen during the heating and cooling cycle. This effect may become undesirable, in special applications. It may be overcome if desired, in those infrequent instances when encountered, by several methods. One such method consists of applying within member 12, during the braze heating and cooling, a gas or fluid pressure sufficient to yield the wall of member 12 tight against the joint and thus maintain intimate joint contact until solidification is complete. In FIGS. 9a–b the connection shown at 18 (also see FIG. 6b) can be utilized to effect such pressure application, when and if needed.

Another method consists in inducing a radial temperature gradient through the total wall thickness 10—14—12 of the assembly thus holding intimate contact by utilizing thermal expansion or contraction. This gradient may be induced by external members which act as heat absorbers when it is desired to keep the outer member 10 cooler than the inner member 12; also cooling jets impinging on outer member 10 will serve the same purpose.

A third method for doing the above is to use external rolls, such as 29—30 of FIGURE 7b, which bear upon the outer member 10 within the heat zone during brazing. By then reducing the effective diameter of said outer member 10, the desired intimate contact in the braze joint 14 again is maintained.

*Multi-Walled Assemblages 10—14—12 Produced by Us*

Our new technique has been used with success in the fabrication of numerous braze-bonded assemblages of the type shown by FIGURES 1–2, with the wall thicknesses of members 10 and 12 generally being equal in many instances and with member 10 having a much heavier wall than member 12 in various other instances. Also assemblages made up of three or more braze-bonded walls, concentrically organized as at 12—10—12″ in FIG. 1a, likewise have been fabricated.

More than twenty assemblages of the double-wall type have been made with a heavy member 10 and a light member 12. Each of these has consisted of a high strength heat treatable steel as member 10 clad on the inside with type 304 stainless steel as member 12. The assemblage, after brazing, was in all of these cases given a heat treatment to develop high strength in the backing steel 10, which heat treatment consisted of a drastic quench from 1650° F. into agitated brine followed by tempering and a sizing operation to obtain precise roundness and straightness. It is significant that each and every one of these brazed joints withstood this severe treatment without damage.

The intended use of these members was as pressure containment parts; and these parts also served as precision alignment devices. Therefore sufficient dimensional accuracy was required after the above sizing to permit boring the inside diameter while maintaining a relatively small and uniform thickness of the stainless steel liner material 12.

In producing the above items three entirely different brazing materials were variously used at 14. One of these was commercially pure copper; the second consisted of 70% manganese and 30% nickel; and the third was an alloy of 85% silver and 15% manganese with and without trace additions of lithium. All three resulted in joint quality and soundness which were uniformly excellent and reproduceable.

The addition of a small quantity of lithium to various brazing materials has proven effective elsewhere in other types of brazing operations in bettering the quality of the joint by virtue of lithium's strong deoxidizing and self fluxing action. However this lithium addition to the 85% silver and 15% manganese material when used with our process had absolutely no effect on the joint quality which was uniformly excellent and defect free both with and without the lithium. This further demonstrates the efficacy of our methods.

The items here being described additionally resulted from utilization of the assembly methods that are depicted by FIGURES 5a, 5b, 6a, 6b, 6c and 9a; which utilization proved all of these mentioned methods to be practical and effective.

Illustrative of the foregoing is the following specific example.

*Typical Example*

An outer tubular member 10 of low alloy chromium-molybdenum steel composition of 7½″ outside diameter and one inch wall thickness with an overall length of 13 inches, had braze bonded thereto a stainless steel liner 12 of ⅛ inch wall thickness. In preparation for the initial assemblage shown by FIGURES 3–4 these parts were machined to provide therebetween a radial space of 1/64 inch separating the outside surface of the liner 12 from the inside surface of the surrounding tube 10.

A strip of braze material 14 applied as in FIGURE 5a was helically wrapped around the liner member 12 in the manner illustrated. This strip 14′ was 0.003 inch thick and 3 inches wide. Its composition was 70% manganese and 30% nickel.

The liner 12 carrying such layer 14 of braze metal then was inserted into the outer tube 10 as shown by FIGURES 3–4. The assemblage was thereupon positioned upright and placed in the fixture which is illustrated by FIGURE 6b and which is equipped with upper and lower pressure closures (not shown) capable of working under more than 40,000 pounds per square inch.

Pressure of 40,000 pounds per square inch was thereupon communicated via connection 18 into the space within the liner member 12, thereby firmly seating this liner against both the braze material 14 and the outer member 10 and further imposing a stress value close to yield on the wall member 10. Such pressure was maintained for a few seconds and then released. Said outer member 10 having a much higher yield strength or elastic limit than member 12 continued to maintain the intimate contact by virtue of its greater springback upon this release of pressure.

Measurements taken during this operation and calculations based on the known mechanical properties of both materials 10 and 12 indicate that an effective interference fit of approximately 0.012 inch on the diameter was achieved. The resultant extreme intimacy of contact was verified by examination with a microscope of specimens cut from assemblies treated in this way. A beneficial effect, earlier mentioned, is the relatively complete exclusion of air from the juncture area 14 prior to application of heat for brazing.

After removing the assemblage from the jig of FIGURE 6b, temporary circumferential seal welds shown at 16 in FIGURE 9a (also in FIGURES 9b–c) were applied to each end of the assemblage between members 10 and 12. The purpose of such welds was to hold in place the braze material 14 when later melted, and also to prevent intrusion of air into the joint. The same thing could of course have been accomplished in some other equivalent manner, such as by use of a refractory cement in lieu of the seal welds 16.

At this point the assemblage 10—14—12 was placed within an induction heating device typified by that shown in FIGURE 9a. Starting with inductor coil 36 at the extreme bottom, alternating current was applied thereto via transformer 37 and the coil held stationary until the bottom end of the assemblage reached the desired brazing temperature of 2050° F.; whereupon motor 41 was started to set the coil in progressive upward movement at a rate proper to maintain said desired temperature of 2050° F. within the advancing heat band inside of and slightly lagging the traveling coil 36.

Said rate of coil travel was about one inch per minute, so that the 13 inch assemblage length was upwardly traversed by coil 36 in approximately 13 minutes. Alterations in this FIGURE 9a equipment would have permitted a much faster rate of upward coil travel.

During such progressive heating the assemblage 10—14—12 was rotated in bearings 42—43 by motor 44 and drive 45. This minimized circumferential temperature gradients.

The heating just described served to melt the brazing material 14 inside the assemblage. This melting of the thin braze layer 14 on both of its two sides 10 and 12 occurred under conditions where air contamination was not present, and was followed by progressive solidification; and such melting and solidification effected a near-perfect union of members 10 and 12. This resultant brazed joint 14 was found to be completely free of flaw indications, as determined by ultrasonic testing, by fluid penetrant testing, and by the various destructive tests that also were applied.

Following removal from the FIGURE 9a apparatus the thus-bonded assemblage 10—14—12 then was subjected to a heat treatment cycle consisting of quenching from 1650° F. into agitated brine, followed by tempering at 1200° F. to obtain desired structure and properties in the backing material 10. During such tempering cycle the assemblage was hot sized at 1200° F., obtaining extremely close tolerances on roundness and straightness.

Seven such assemblages were processed in the above described manner with equally excellent results in all instances.

Other Brazed Assemblages Produced

Also produced by us have been more than thirty-five further assemblages wherein the wall thicknesses of the braze bonded members 10 and 12 were in most cases (but not all) generally equal. In some of these low alloy steel tubing was joined to the same class of material, while in others tubing of austenitic stainless steel similarly was joined to the same class of material.

Fabrication steps as diagrammed in FIGURES 6c, 9c, 10b and 11 were here used and evaluated, along with numerous other modifications earlier described herein but not shown in the drawings, and were all found to be practical and beneficial under appropriate conditions. In this work certain of the above iron-base materials 10 and 12 being joined were alloyed with titanium which is generally conceded to render braze bonding more difficult. No difficulty at all was encountered when using our methods to join type 321 stainless steel with alloy steel containing 5% chromium plus ½% molybdenum plus ½% titanium, and braze joint quality was fully equal to that obtained for similar alloy materials which were titanium free.

Also evaluated during this further work were the high strength nickel base brazing materials 14 that are useful for high temperature service; and when employed in our process these were found to yield excellent results.

Likewise joined successfully were members 10 and 12 respectively consisting of type 410 stainless steel and of a grade of Inconel (75% nickel, 15% chromium, 7% iron alloy) which was further alloyed with titanium; and here the same excellent quality of braze bonding 14 was obtained.

Moreover, the preliminary assembly step of explosive expansion that is disclosed by FIGURES 8—8x and earlier described herein has been proven by actual trial to be extremely effective in producing intimate metal-to-metal contact when the assembled unit includes as many as five concentric layers. A demonstration sample so produced had an outer diameter of 5⅜ inches after expansion, was 12 inches long, and each of its five concentric layers of carbon steel was 3/32 inch thick.

Summary

While we have shown and described illustrative embodiments of our invention, it is to be understood that such invention is capable of many modifications. Changes may therefore be made in the construction and arrangement without departing from the spirit and scope of the invention as defined by the appended claims.

What we claim is:

1. In a method of brazing a metal member of generally tubular contour to another metal member of mating tubular shape, the steps which comprise placing the two tubular members in concentric nesting relationship with a thin layer of brazing material disposed between the inner member and the outer member, there being a space between the two metal members so assembled, mechanically deforming one of said two nested members radially towards and against the other with resultant exertion upon the said brazing material layer therebetween of an intense compressive force which effects intimate contact throughout the joint surface area with an accompanying exclusion of air from such area, sealing the thus compressed layer of brazing material against both material outflow and air inflow upon later melting, heating the assemblage of these thus contacted and sealed parts to a temperature sufficient to melt the said layer of brazing material while maintaining that layer under the aforesaid intense compression between the nested tubular members, and cooling said assemblage to below the melting range of said heated and compressed brazing material with an accompanying solidification of that material into a bond which integrally and continuously joins the said two nested members together throughout the area of their contacting surfaces, all of the foregoing being done without the aid of a fluxing agent or of a protective atmosphere or of a vacuum.

2. The method defined by claim 1 wherein the recited intense compressive force upon said brazing material layer is set up by and maintained as a result of an outward mechanical expansion of said inner tubular member radially towards and against that layer and the said outer tubular member which surrounds and backs the layer, said expansion of the concentrically disposed inner member causing said brazing material layer therearound to be compressively hugged thereagainst by said outer surrounding member.

3. The method defined by claim 1 wherein the recited intense compressive force upon said brazing material layer is set up and maintained by an outward mechanical expansion of said inner tubular member radially towards and against that layer and the said outer tubular member which surrounds and backs the layer, said outward expansion being produced by confining an explosive charge within the interior of said inner member and then detonating that charge.

4. The method defined by claim 1 wherein the recited intense compressive force upon said brazing material layer is set up by and maintained as a result of an inward mechanical contraction of said outer tubular member radially towards and against that layer and the said inner tubular member concentrically disposed therewithin, said contraction of the outer surrounding member causing said brazing material layer inside thereof to be compressively hugged thereby against the said inner member.

5. The method defined by claim 1 wherein the said assemblage of contacted and sealed parts has the specified heating applied thereto in the form of a defined heating band which advances along the length of the assemblage from one end to the other and which produces a progressive heating of the metal parts in the assemblage length followed by a progressive cooling of those parts.

6. The method defined by claim 1 wherein the said assemblage of contacted and sealed parts has the specified heating applied thereto by passing an electrical current lengthwise through the metal parts that make up the assemblage.

7. The method defined by claim 1 wherein the said assemblage of contacted and sealed parts has applied thereto during the specified cycle of heating and cooling a superimposed vibration which has the beneficial effect of promoting wetting of the joint surfaces and eliminating surface cavities with resultant improvement in the joint quality.

8. In a method of brazing three or more metal members of mating tubular shape, the steps which comprise placing the members in concentric nesting relationship with a thin layer of brazing material disposed between each concentric member, there being a space between each of said members and its adjacent member so assembled, mechanically deforming the members radially towards and against one another with resultant exertion upon the said brazing material layers therebetween of an intense compressive force which effects intimate contact throughout the joint surface areas with an accompanying exclusion of air from such areas, sealing the thus compressed layers of brazing material against both material outflow and air inflow upon later melting, heating the assemblage of these thus contacted and sealed parts to a temperature sufficient to melt the said layers of brazing material while maintaining these layers under the aforesaid intense compression between the nested tubular members, and cooling said assemblage to below the melting range of said heated and compressed brazing material with an accompanying solidification of that material into bonds which integrally and continuously join the said nested members together throughout the areas of their contacting surfaces, all of the foregoing being done without the aid of a fluxing agent or of a protective atmosphere or of a vacuum.

References Cited in the file of this patent

UNITED STATES PATENTS

| | | |
|---|---|---|
| 427,924 | Smith | May 13, 1890 |
| 460,921 | Meyer | Oct. 6, 1891 |
| 895,412 | Badger | Aug. 11, 1908 |
| 930,927 | Berkstresser | Aug. 10, 1909 |
| 939,702 | Jones | Nov. 9, 1909 |
| 1,040,606 | Auth | Oct. 8, 1912 |
| 1,392,416 | Henderson | Oct. 4, 1921 |
| 2,367,206 | Davis | Jan. 16, 1945 |
| 2,397,400 | Barwich | Mar. 26, 1946 |
| 2,708,249 | Pryslak | May 10, 1955 |
| 2,708,306 | Lampton | May 17, 1955 |
| 2,716,276 | Brown | Aug. 30, 1955 |
| 2,775,029 | Bennett et al. | Dec. 25, 1956 |